US011719850B2

(12) United States Patent
Castleman et al.

(10) Patent No.: US 11,719,850 B2
(45) Date of Patent: Aug. 8, 2023

(54) DETECTING AND COMPENSATING FOR MAGNETIC INTERFERENCE IN ELECTROMAGNETIC (EM) POSITIONAL TRACKING

(71) Applicant: Sony Interactive Entertainment Inc., Tokyo (JP)

(72) Inventors: Dennis D. Castleman, Fremont, CA (US); Xiaoyong Ye, South San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/897,170

(22) Filed: Jun. 9, 2020

(65) Prior Publication Data

US 2020/0400856 A1 Dec. 24, 2020

Related U.S. Application Data

(60) Provisional application No. 62/864,499, filed on Jun. 20, 2019.

(51) Int. Cl.

*G01V 3/38* (2006.01)
*G01V 3/36* (2006.01)
(Continued)

(52) U.S. Cl.

CPC ................ *G01V 3/38* (2013.01); *G01V 3/108* (2013.01); *G01V 3/36* (2013.01); *G02B 27/017* (2013.01); *G06F 3/011* (2013.01)

(58) Field of Classification Search

CPC ............ G01V 3/38; G01V 3/108; G01V 3/36; G02B 27/017; G06F 3/011; G01S 5/0221; G01S 5/0294; G01S 5/06; G01S 5/0215

See application file for complete search history.

(56) References Cited

U.S. PATENT DOCUMENTS 5,645,077 A * 7/1997 Foxlin .................. A61B 5/1114 600/595
6,369,564 B1 * 4/2002 Khalfin ................ G01B 3/1084 324/207.17

(Continued)

FOREIGN PATENT DOCUMENTS

CA 3034644 A1 * 3/2018 ............. A63F 13/00
CA 3076356 A1 * 5/2020 ............. A61B 34/20

(Continued)

OTHER PUBLICATIONS

Sadjadi et al., Simultaneous localization and calibration for electromagnetic tracking systems. The International Journal of Medical Robotics and Computer Assisted Surgery Int J Med Robotics Comput Assist Surg 2016; 12: 189-198. Published online May 28, 2015 in Wiley Online Library (Year: 2015).*

(Continued)

*Primary Examiner* — Jermele M Hollington
*Assistant Examiner* — Sean Curtis
(74) *Attorney, Agent, or Firm* — Fitch, Even, Tabin & Flannery LLP

(57) ABSTRACT

A method includes using an electromagnetic (EM) tracking system to track a tangible object, detecting a presence of interference with a magnetic field generated by the EM tracking system, and compensating for the interference. A system includes an EM tracking transmitter, an EM tracking receiver, and a processor based apparatus in communication with the EM tracking transmitter and the EM tracking receiver. The processor based apparatus is configured to execute steps including using the EM tracking transmitter and the EM tracking receiver to implement an EM tracking system. A storage medium storing one or more computer programs is also provided.

23 Claims, 6 Drawing Sheets

(51) Int. Cl.
*G01V 3/10* (2006.01)
*G06F 3/01* (2006.01)
*G02B 27/01* (2006.01)

(56) References Cited

U.S. PATENT DOCUMENTS 6,624,626 B2 * 9/2003 Khalfin .................. G01S 1/024 324/207.12
6,762,600 B2 * 7/2004 Khalfin .................. G01S 1/024 324/207.17
7,009,561 B2 * 3/2006 Menache ................ A63F 13/06 342/463
7,536,262 B2 * 5/2009 Hornbostel ............ G01V 3/083 702/17
7,835,785 B2 * 11/2010 Scully .................... A61B 5/062 600/424
7,902,816 B2 * 3/2011 Shechter ................ A61B 5/062 324/207.12
8,228,028 B2 * 7/2012 Schneider .............. A61B 34/20 324/207.16
8,942,780 B2 * 1/2015 Scully .................... A61B 5/062 600/407
9,024,810 B2 * 5/2015 Lohbihler ............... G01S 11/06 342/134
9,354,316 B2 * 5/2016 Larson ............... G02B 27/0093
9,436,286 B2 * 9/2016 Padovani ................ G06F 3/017
9,522,045 B2 * 12/2016 Ramachandran ...... A61B 6/547
9,933,509 B2 * 4/2018 Hill ...................... G01S 5/0221
10,013,808 B2 * 7/2018 Jones ..................... G06F 3/011
10,231,614 B2 * 3/2019 Krueger ................. A61B 5/163
10,285,760 B2 * 5/2019 Sadjadi ................. A61B 34/10
10,317,989 B2 * 6/2019 Rouvinez ................ G06F 3/011
10,402,649 B2 * 9/2019 Rabinovich ............. G06F 3/011
10,416,333 B2 * 9/2019 Fullam .................. H04W 88/06
10,534,454 B2 * 1/2020 Stafford .................. A63F 13/21
10,546,423 B2 * 1/2020 Jones .................... G06F 3/0346
10,580,217 B2 * 3/2020 Jones ...................... G06T 19/20
10,650,552 B2 * 5/2020 Woods ...................... G06T 7/74
10,650,594 B2 * 5/2020 Jones ...................... G06F 3/017
10,733,447 B2 * 8/2020 Rabinovich ............ G06N 3/006
10,740,502 B2 * 8/2020 Duff ........................ G06F 30/13
10,746,819 B2 * 8/2020 Chung .................. G06F 3/0346
10,776,529 B2 * 9/2020 Duff ...................... G06T 19/006
10,786,310 B2 * 9/2020 Bharat ................. A61N 5/1027
10,788,791 B2 * 9/2020 Gelman ................ G06T 19/006
10,916,064 B2 * 2/2021 Wan ........................ G06F 3/011
10,935,392 B2 * 3/2021 Trythall ............... G01C 25/005
10,996,742 B2 * 5/2021 Connellan ............. G01S 5/0294
11,016,305 B2 * 5/2021 Wan ........................ G06F 3/014
11,157,090 B2 * 10/2021 Chan .................. G02B 27/0179
11,187,823 B2 * 11/2021 Ashe ...................... G01V 3/081
11,194,386 B1 * 12/2021 Zhao ....................... G06F 1/163
11,353,709 B2 * 6/2022 Wan ........................ G06F 3/014
11,397,478 B1 * 7/2022 Gutierrez ............ G06F 3/03545
11,467,657 B2 * 10/2022 Zhao ........................ G01B 7/30
2003/0016006 A1 * 1/2003 Khalfin .................. A61B 5/062 324/207.17
2003/0023192 A1 * 1/2003 Foxlin ................... A61B 5/1114 600/595
2003/0201767 A1 * 10/2003 Khalfin .................... G01V 3/08 324/207.17
2004/0090226 A1 * 5/2004 Khalfin ..................... G01S 5/02 324/207.17
2004/0107070 A1 * 6/2004 Anderson .............. A61B 90/36 702/150
2004/0178955 A1 * 9/2004 Menache .............. A63F 13/213 342/463
2005/0107687 A1 * 5/2005 Anderson ................ A61B 5/06 702/85
2006/0125691 A1 * 6/2006 Menache .............. A63F 13/235 342/450
2007/0078334 A1 * 4/2007 Scully ...................... A61B 5/06 600/424
2007/0239403 A1 * 10/2007 Hornbostel .............. G01V 3/38 702/191
2008/0309326 A1 * 12/2008 Schechter ................ A61B 5/06 324/207.12
2010/0082280 A1 * 4/2010 Schneider ................ A61B 5/06 702/94
2010/0168556 A1 * 7/2010 Shen ..................... A61B 5/062 600/424
2011/0082366 A1 * 4/2011 Scully .................... A61B 5/062 600/424
2011/0270083 A1 * 11/2011 Shen ..................... A61B 5/062 600/424
2011/0279366 A1 * 11/2011 Lohbihler ............. B25J 13/089 702/158
2012/0172126 A1 * 7/2012 Padovani ................ G06F 3/017 463/36
2013/0119773 A1 5/2013 Davis
2013/0238270 A1 * 9/2013 Khalfin ................. G01D 18/00 702/94
2014/0354300 A1 * 12/2014 Ramachandran ...... G01R 23/00 324/654
2015/0043323 A1 2/2015 Choi
2015/0097732 A1 * 4/2015 Hill ...................... G01S 5/0294 342/465
2015/0234050 A1 * 8/2015 Larson .................. G01S 7/4813 356/369
2015/0309154 A1 * 10/2015 Lohbihler ........... H01H 13/023 342/134
2016/0223636 A1 * 8/2016 Lohbihler ............. H01H 13/10
2016/0225192 A1 * 8/2016 Jones ...................... G06F 3/012
2017/0014192 A1 * 1/2017 Bharat .................. A61B 5/062
2017/0262045 A1 * 9/2017 Rouvinez ................ G06F 3/011
2018/0008141 A1 * 1/2018 Krueger ................... A61B 5/11
2018/0012413 A1 * 1/2018 Jones .................... A61B 90/37
2018/0012416 A1 * 1/2018 Jones .................... A61B 34/10
2018/0053056 A1 * 2/2018 Rabinovich .......... G06V 10/454
2018/0239144 A1 * 8/2018 Woods ................. A63F 13/212
2018/0266847 A1 * 9/2018 Trythall .............. G02B 27/017
2018/0286136 A1 * 10/2018 Jones ...................... G06F 3/017
2018/0300897 A1 * 10/2018 Woods .................. G06F 3/0484
2019/0056693 A1 * 2/2019 Gelman ............... G02B 27/017
2019/0101614 A1 * 4/2019 Lohbihler .............. G01S 13/10
2019/0113966 A1 * 4/2019 Connellan ................. G01S 5/30
2019/0120925 A1 * 4/2019 Lohbihler ............ H03K 17/968
2019/0196578 A1 * 6/2019 Iodice ..................... G01S 15/66
2019/0242952 A1 * 8/2019 Schneider .............. G06F 3/017
2019/0243472 A1 * 8/2019 Stafford ............... G02B 27/017
2019/0340435 A1 * 11/2019 Rabinovich ........... A63F 13/213
2019/0347368 A1 * 11/2019 Duff ...................... G06T 19/006
2019/0353745 A1 * 11/2019 Zur ......................... G01S 5/021
2020/0019232 A1 * 1/2020 Rouvinez ............. G06T 19/006
2020/0027275 A1 * 1/2020 Wan ........................ G06F 3/017
2020/0034501 A1 * 1/2020 Duff .......................... G01S 5/02
2020/0133405 A1 * 4/2020 Chan ................. G01R 33/0082
2020/0184729 A1 * 6/2020 Jones .................... G06T 19/006
2020/0219324 A1 * 7/2020 Jones ...................... G06F 3/017
2020/0226785 A1 * 7/2020 Woods .................... G06T 7/277
2020/0241292 A1 * 7/2020 Degges, Jr. ......... G01P 15/0888
2020/0242845 A1 * 7/2020 Jones .................... G06F 3/0346
2020/0319361 A1 * 10/2020 Ashe ...................... G01V 3/087
2020/0326544 A1 * 10/2020 Wan ....................... G01B 7/004
2020/0334395 A1 * 10/2020 Duff ........................ G06F 30/13
2020/0334461 A1 * 10/2020 Rabinovich ........... G06F 3/0346
2020/0368616 A1 * 11/2020 Delamont ............... A63F 13/25
2020/0371584 A1 * 11/2020 Zhao .................... G06F 3/0346
2020/0400856 A1 * 12/2020 Castleman ............. G01V 3/108
2020/0409306 A1 * 12/2020 Gelman ............... G03H 1/0005
2021/0043398 A1 * 2/2021 Lohbihler ............ H03K 17/943
2021/0065731 A1 * 3/2021 Matsukawa ............ G06N 20/00
2021/0073436 A1 * 3/2021 Duff ........................ G06F 30/13
2021/0239993 A1 * 8/2021 Wan .......................... G01S 5/06
2022/0035461 A1 * 2/2022 Chan ...................... G01R 33/02
2022/0260839 A1 * 8/2022 Wan ........................ G06F 18/25
2022/0276729 A1 * 9/2022 Gutierrez ................ G06F 3/016
2023/0083524 A1 * 3/2023 Collins ................ G01R 33/025

(56) References Cited

U.S. PATENT DOCUMENTS

FOREIGN PATENT DOCUMENTS

| | | | | | |
|---|---|---|---|---|---|
| CN | 103869279 B | * | 1/2017 | ............... | G01S 5/00 |
| CN | 114008514 A | * | 2/2022 | ............. | G01B 7/004 |
| WO | WO-03102497 A1 | * | 12/2003 | ............. | G01S 1/024 |
| WO | WO-2007041678 A2 | * | 4/2007 | ............... | A61B 5/06 |
| WO | WO-2010085877 A1 | * | 8/2010 | ............. | A61B 34/20 |
| WO | WO-2012094038 A1 | * | 7/2012 | .............. | G06F 3/011 |
| WO | WO-2020147898 A1 | * | 7/2020 | ............. | G01B 7/003 |
| WO | WO-2020236943 A1 | * | 11/2020 | ............. | A63F 13/21 |
| WO | 2020257182 | | 12/2020 | | |
| WO | WO-2020257182 A1 | * | 12/2020 | ............. | G01V 3/108 |

OTHER PUBLICATIONS

Patent Cooperation Treaty; Notification of Transmittal of the International Search Report and the Written Opinion of the International Searching Authority issued in PCT Application No. PCT/US2020/037908, dated Sep. 9, 2020; 1 page.

Patent Cooperation Treaty; International Search Report issued in PCT Application No. PCT/US2020/037908, dated Sep. 9, 2020; 2 pages.

Patent Cooperation Treaty; Written Opinion of the International Searching Authority issued in PCT Application No. PCT/US2020/037908, dated Sep. 9, 2020; 19 pages.

* cited by examiner

DETECTING AND COMPENSATING FOR MAGNETIC INTERFERENCE IN ELECTROMAGNETIC (EM) POSITIONAL TRACKING

CROSS-REFERENCE TO RELATED APPLICATIONS

This application claims the benefit of U.S. Provisional Patent Application No. 62/864,499, filed on Jun. 20, 2019, entitled "DETECTING AND COMPENSATING FOR MAGNETIC INTERFERENCE IN ELECTROMAGNETIC (EM) POSITIONAL TRACKING", the entire contents and disclosure of which is hereby fully incorporated by reference herein in its entirety.

BACKGROUND OF THE INVENTION

1. Field of the Invention

Embodiments of the present invention relate generally to positional and motion tracking technologies, and more specifically to electromagnetic (EM) positional and motion tracking technology.

2. Discussion of the Related Art

Positional tracking can be used to detect the position of an object within three-dimensional space. For example, positional tracking is used by virtual reality (VR) systems to track the position a VR headset, such as head-mounted display (HMD), and one or more handheld controllers. There are numerous other uses and applications for positional tracking.

SUMMARY OF THE INVENTION

One embodiment provides a method, comprising: using an electromagnetic (EM) tracking system to track a tangible object; detecting a presence of interference with a magnetic field generated by the EM tracking system; and compensating for the interference.

Another embodiment provides a system, comprising: an electromagnetic (EM) tracking transmitter; an EM tracking receiver; and a processor based apparatus in communication with the EM tracking transmitter and the EM tracking receiver; wherein the processor based apparatus is configured to execute steps comprising: using the EM tracking transmitter and the EM tracking receiver to implement an EM tracking system; using the EM tracking system to track a tangible object; detecting a presence of interference with a magnetic field generated by the EM tracking system; and compensating for the interference.

Another embodiment provides a non-transitory computer readable storage medium storing one or more computer programs configured to cause a processor based system to execute steps comprising: using an electromagnetic (EM) tracking system to track a tangible object; detecting a presence of interference with a magnetic field generated by the EM tracking system; and compensating for the interference.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Figure 1:
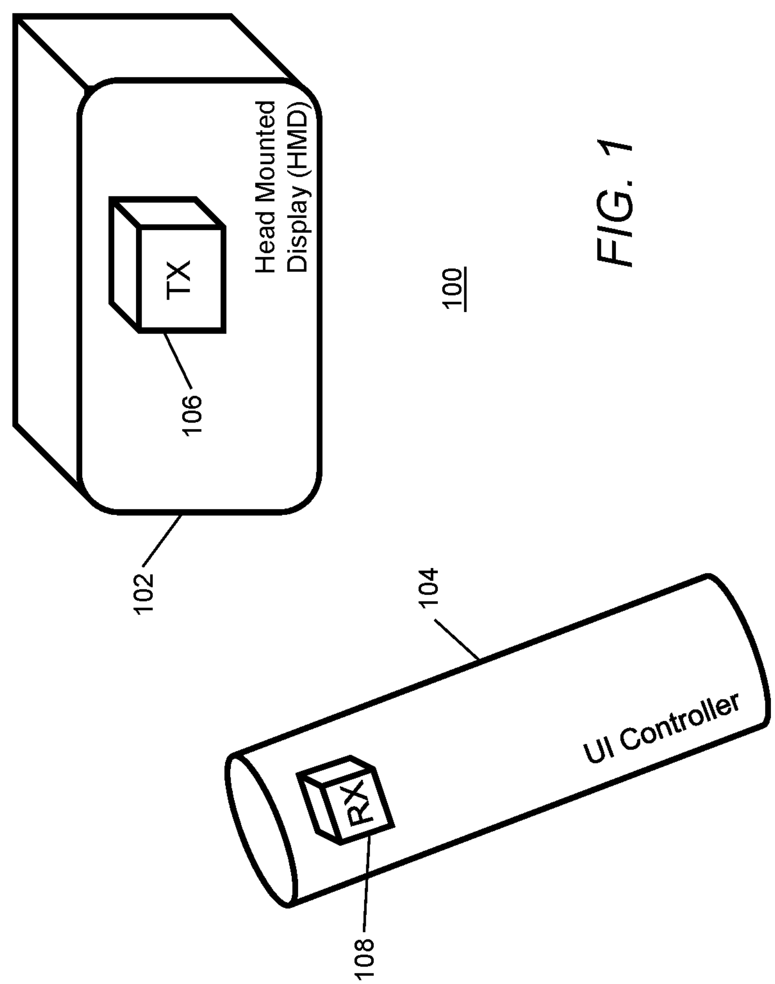
FIG. 1 is a diagram illustrating a head-mounted display (HMD) and a handheld controller of a VR system operating in accordance with some embodiments of the present invention.

There are several different types of positional tracking technologies and techniques. For example, optical tracking typically uses devices such as cameras, stereo cameras, depth sensing cameras, and other types of image capture devices and sensors. Optical tracking is also sometimes known as image, video, and/or visual tracking. One disadvantage of optical tracking is that it requires a direct line of sight with no occlusions.

Inertial tracking typically uses data from devices such as inertial measurement units (IMU), accelerometers, gyroscopes, and the like. Although position determination using an inertial sensor may be made more quickly than with optical tracking, the inertial sensor may be subject to a type of error known as "drift" in which errors that accumulate over time can lead to inaccurate results.

Acoustic tracking measures the time it takes a particular acoustic signal to reach a receiver. One disadvantage of acoustic tracking is that it tends to be slower and can add latency.

Electromagnetic (EM) tracking uses magnetic fields to track the position of an object by measuring the intensity of the magnetic fields. A transmitter uses three coils that are perpendicular to each other on x, y, and z axes to generate a magnetic field in the three spatial directions. A receiver is typically mounted in the object to be tracked and also includes three coils in the same three axis orientation. The transmitter transmits three different frequencies, and those frequencies create an oscillating magnetic wave. The coils in the receiver measure the magnetic field strength in each axis. The measurements are used to calculate the position and orientation (PNO) of the coils. Some of the disadvantages of EM tracking will be discussed extensively below.

Sensor fusion is the combining or mixing of data from two or more different positional tracking technologies, techniques, or algorithms. For example, a single object may be tracked simultaneously by an EM tracking system, an optical tracking system, and an inertial tracking system, which is often referred to as a "mixed mode" tracking system. The collected data from each of the three systems or modes is combined or mixed to produce a result that is often more accurate than if only one tracking technique were used. Furthermore, the weights of consideration given to the data from each system may be adjusted or changed to provide optimal results depending on conditions. For example, if an occlusion occurs and interferes with the optical tracking, the weight given to the optical data may be reduced while the weight given to the EM and/or inertial tracking data may be increased. Once the occlusion has gone away, the weight given to the optical data may be increased while the weight given to the inertial tracking data is decreased to avoid the inevitable drift of inertial tracking.

As stated above there are numerous uses and applications for positional tracking and for detecting the position of an object within three-dimensional space. For example, positional tracking is often used for tracking hand-held controllers, game controllers, game pads, wands, and the like, for gaming applications and other computer simulation applications. Such controllers are often referred to as user interface (UI) controllers. Furthermore, positional tracking is often used by virtual reality (VR), augmented reality (AR), and mixed reality (MR) systems to track the positions of objects such as headsets, VR headsets, glasses-type user devices, head-mounted displays (HMD), etc., as well as one or more handheld controllers, wands, etc.

For gaming, VR, AR, and MR types of uses and applications, as well as other types of uses and applications, electromagnetic (EM) tracking offers several advantages over the other positional tracking technologies described above. For example, EM tracking does not need cameras and can be used as an alternative to optical tracking, inertial tracking, etc. Furthermore, EM tracking does not require line of sight, which means there are no occlusion or blocking issues as there are with optical tracking. This can allow a user to reach behind his or her head and back because the hand-held controller will still be tracked. And there are no requirements for having a certain amount of light in the room for EM tracking to operate. Furthermore, EM tracking has a large or even unlimited field of view (FOV). EM tracking can often be established in a smaller form factor with no obvious tracking markers. For example, a tracking ball is not needed. And EM tracking often requires less hardware with less setup and less calibration. These advantages make EM tracking an attractive option for gaming and other computer simulation applications, as well as for use in VR, AR, and/or MR systems.

While EM tracking has several advantages, it also has some disadvantages. For example, nearby metals, such as rebar in floors, can cause or create distortion in the generated magnetic fields. And some nearby electrical sources can create interference in the generated magnetic fields. Both of these can adversely affect the accuracy of EM tracking. Thus, one of the drawbacks of magnetic trackers is this interference and distortion problem.

Some of the embodiments of the present invention provide methods, systems, and techniques that can be used with EM tracking systems to detect the presence of magnetic interference, and then compensate for the magnetic interference. Such detection and compensation helps to reduce the adverse effects caused by magnetic interference on EM tracking systems.

Some of the embodiments of the methods, systems, and techniques described herein will now be discussed with reference to FIG. 1, which illustrates a system 100 that operates in accordance with an embodiment of the present invention. The system 100 comprises a virtual reality (VR) system that includes a headset 102, such as a head-mounted display (HMD), and a handheld UI controller 104.

The system 100 employs an EM tracking system. Specifically, in some embodiments an EM tracking transmitter 106 is mounted in the headset 102, and an EM tracking receiver 108 is mounted in the controller 104. In some embodiments, the transmitter 106 is in the shape of a cube because as mentioned above, the transmitter 106 uses three coils that are perpendicular to each other on x, y, and z axes to generate a magnetic field in the three spatial directions. That is, the three coils in the transmitter 106 comprise three different windings on three axes. The transmitter 106 transmits three different frequencies, and those frequencies create an oscillating magnetic wave that oscillates at a known frequency.

The receiver 108 comprises a smaller cube and also includes three coils in the same three axis orientation. The three coils on the x, y, and z axes of the receiver 108 sense the magnetic fields generated by the transmitter 106. Each sample sensed or measured by the x, y, and z axes of the receiver 108 is converted into a 24 bit number by an analog to digital converter (ADC). The measurements are then used to calculate the position and orientation (PNO) of the coils, which provides the PNO of the controller 104.

By having the transmitter 106 mounted in the headset 102 and the receiver 108 mounted in the controller 104, the EM tracking system determines the position of the controller 104 relative to the headset 102. As such, the EM tracking system constantly determines where the user's hands are located relative to where the user's head is located. That allows the VR system to model the user's hands and head in the VR environment. Thus, the transmitter 106 and receiver 108 will typically be located within one meter of each other during use, which would typically be the longest reach of a human's arms.

In some embodiments the controller 104 and/or the headset 102 will also include other electrical sources, such as for example haptics devices, one or more wireless transceivers (e.g. Bluetooth), etc. Haptics devices are often one of the biggest sources of interference and noise, and they tend to be in the audio frequency spectrum. Haptics devices often include small electric motors having brushes. These electrical sources, e.g. haptics, Bluetooth, etc., can have an electromagnetic effect, and also a mechanical effect, that can adversely affect the EM tracking. This is at least partly because the receiver 108 is often sitting/mounted near the electronics of the controller 104. Furthermore, some haptic sources emit more electromagnetic interference (EMI) in one orientation. For example, the end of the motor where the brushes are located tends to be noisier than the opposite end. The adverse effects can include saturating the EM signal, creating a noisy signal that causes jitter and/or errors in the tracking, and IMU noise (mechanical vibration). Thus, there are many things inside a UI controller that can generate magnetic fields and thus create interference with the EM tracking.

In addition to the electrical sources that may be included in the controller 104 and/or the headset 102, there may also be other nearby environmental interference sources, such as cellphones, other mobile devices, speakers, and even another game controller, such as when a VR system includes two hand-held controllers. These electrical sources can also create magnetic interference that adversely affects the accuracy of the EM tracking by interfering with the magnetic fields generated by the transmitter 106. Thus, things outside of a UI controller can distort the magnetic field, which can cause errors in the magnetic tracking.

The electrical sources both inside and outside of a UI controller that can create magnetic interference are particularly problematic when using EM tracking in the context of gaming or other computer simulations. This is because the location of a controller at any given moment is very unpredictable in the gaming context. The controller may at any time be randomly located near electrical sources, such as cellphones, etc., that can create magnetic interference. Furthermore, as mentioned above, haptics devices can have an electromagnetic effect and create distortion. While the system knows when some haptics devices are turned on, other haptics devices are controlled by the user and the system does not know when they will be turned on. And additionally, when two handheld controllers are being used, the haptics devices in one controller might be interfering with the receiver in the other controller. As such, the issues of interference and distortions of the magnetic field have previously presented problems for the use of EM tracking in gaming applications.

As mentioned above, some of the embodiments of the present invention provide for detecting the presence of magnetic interference and then compensating for the magnetic interference. This can help to make EM tracking more usable in the gaming context.

A technique for sensing when magnetic interference is present will be described first. Once the presence of magnetic interference is detected, embodiments of the present invention provide techniques for compensating for the magnetic interference, including a multipronged approach for compensating for the magnetic interference.

In existing EM tracking systems the transmitter is normally turned on continuously. In some embodiments of the present invention, the presence of magnetic interference in EM tracking is detected by pulsing the magnetics signal instead of having it constant. By doing that the receiver 108 will detect the noise when the transmitter 106 is off. More specifically, in some embodiments, the transmitter 106 is periodically turned off. The purpose of periodically shutting down the transmit coil is so that while the transmitter 106 is shut off the receiver 108 will still be collecting samples. Given that the receiver 108 will know that the transmitter 106 is shut off, the receive samples collected during transmit off period can be used to determine the amount of interference being generated by external sources such as haptics devices being active.

Figure 2:
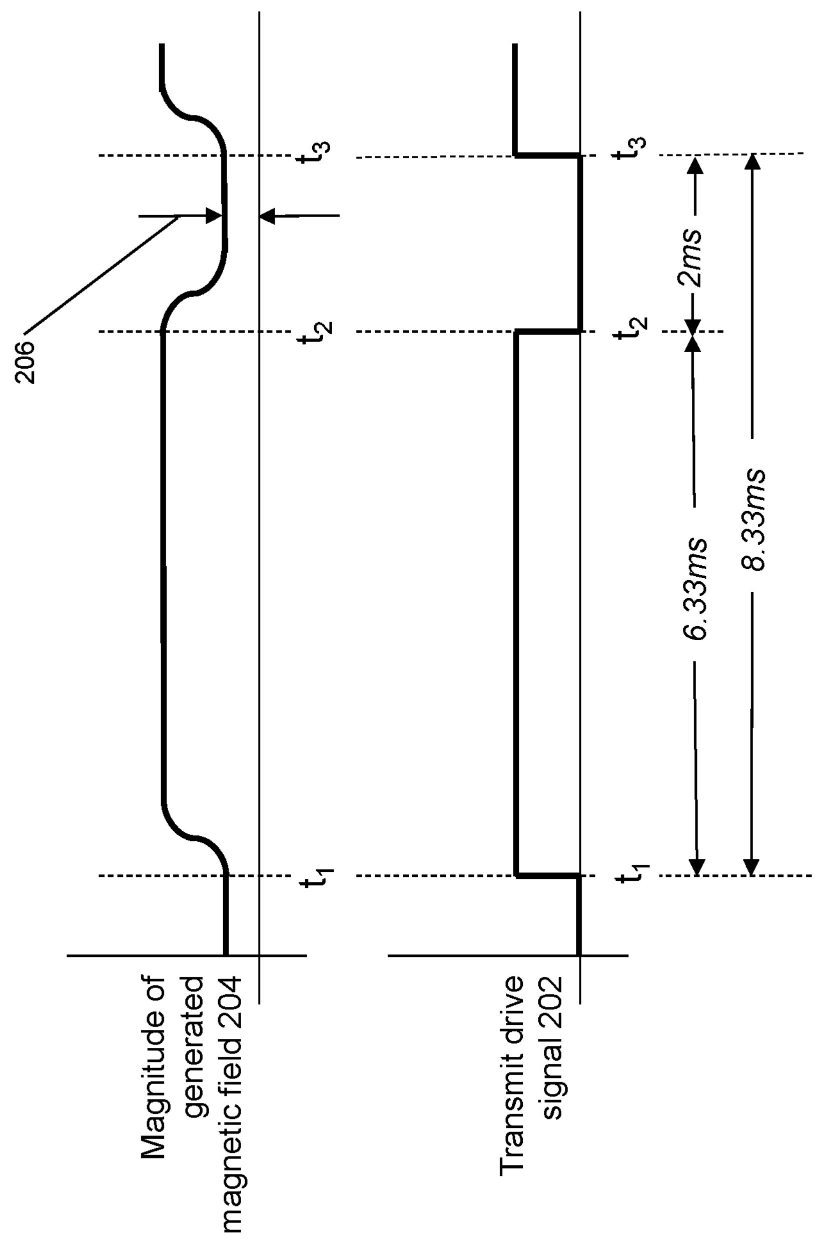
FIG. 2 is a timing diagram illustrating a method in accordance with some embodiments of the present invention.

FIG. 2 illustrates an example of this pulsing technique in accordance with an embodiment of the present invention. Specifically, a transmit drive signal 202 is used for driving one of the coils in the transmitter. In some embodiments the transmit drive signal 202 is a square wave as shown. Only one transmit drive signal 202 is shown. Each transmitter will have its own channel frequency for the X, Y, and Z channels. For this example it will be assumed that the display rate of the display is 120 Hz, but it should be understood that other display rates may be used. A display rate of 120 Hz provides a period of 8.33 ms for each frame, i.e. 8.33 ms per fame at 120 Hz. During the frame time of 8.33 ms the receiver will be collecting samples. In some embodiments, 800 samples are captured in the 8.33 ms period. This happens simultaneously for each coil. That is, each coil is sampled, and so there will be 800 samples for each of the three coils.

As shown, the transmit drive signal 202 turns on at time $t_1$. Also shown is the magnitude of the generated magnetic field 204. At time $t_1$ the generated magnetic field 204 begins to build up in response to the transmit drive signal 202 being turned on. A square wave pulsing into the coil generating the magnetic field will result in the magnetic field being a sine wave as it takes time for the magnetic field build up.

In accordance with an embodiment of the present invention, the transmit drive signal 202 is shut off for 2 ms of the 8.33 ms period. This occurs at time $t_2$. That is, the system turns off the transmit drive signal 202 for 2 ms out of every 8.33 ms frame. This means each transmit channel will be turned on for 6.33 ms and turned off for 2 ms synchronized via the vertical sync of the display device, which in this case is 120 Hz. Therefore, as shown, the transmit drive signal 202 remains turned off from time $t_2$ to time $t_3$.

Because the transmit drive signal 202 is turned off at time $t_2$, the magnitude of the generated magnetic field 204 also begins to decrease at time $t_2$.

During the 2 ms of off time (i.e. from time $t_2$ to time $t_3$) the receiver will be measuring the interference. As illustrated, the magnitude of the generated magnetic field 204 never quite reaches zero from time $t_2$ to time $t_3$. This is because of the interference that is present. By way of example, the magnitude of the interference is illustrated at 206 in FIG. 2. Namely, at that point in time the samples that the receiver is receiving is just the interference and distortion that is in the area. This is because the transmitter is turned off and is not sending any data, so anything being measured and collected is the interference and distortion in the area. Interference data tends to have a lot of spikes when the transmitter is on. By turning the transmitter off, only the interference and noise will be collected. In some scenarios the interference is similar for each of the three coils in the receiver.

In some embodiments, for the 2 ms of the period that the transmitter is shut off, the receiver will know that the transmitter is off. Ideally, the receiver is synchronized to the transmitter, so the receiver will know the transmitter is off. The receiver is sampling the data, and because the receiver is sampling the data, it has to gather so many samples for the period of time that is being referenced. The period of time that is being referenced is the time it takes one frame to be displayed on the screen (in the VR environment). That is the period of time the systems gets to adjust the position before the next frame is displayed. Synchronizing the receiver to the transmitter helps to minimize latency by keeping the tightest, lowest latency between physical movement and what is displayed on the screen.

In some embodiments, the receiver knows the transmitter is off because everything is synchronized to the frame rate via the sync pulse of the display screen. That is, the receiver is on the game controller side, and the transmitter is on the headset side. All have a link to, and all are being driven by, the same system, such as for example a gaming or entertainment system, that they are plugged into. That system is the originator of the sync pulse, and so it simultaneously sends the sync pulse to the receiver, because it already has a data channel to the receiver. Because everything is synchronized to the frame rate via the sync pulse of the display screen, the display tells the receiver every time it starts a new refresh cycle. This helps to prevent drift and to ensure that the data collected is within the one frame period. But if drift is not a problem in some embodiments, then the system could just look at the frequency on the receive side to know the transmitter is turned on. In some embodiments, the transmit side is responsible for keeping the time base, such as in embodiments with no display.

Therefore, in some embodiments, detecting or sensing the presence of interference with a magnetic field generated by an EM tracking system comprises periodically turning off at least one transmit coil used by the EM tracking system.

Then, samples are collected by a receive coil used by the EM tracking system during periods when the at least one transmit coil is turned off. The collected samples are then analyzed to determine the presence of magnetic interference. In some embodiments, this technique is applied to all three transmit coils simultaneously.

As mentioned above, once the presence of magnetic interference with an EM tracking system is sensed or detected, embodiments of the present invention provide techniques for compensating for the magnetic interference. One such technique takes advantage of the pulsing of the magnetics signal just described. Specifically, in some embodiments, the interference information gathered during the transmitter off period is used by the PNO algorithm to minimize the effect of the interference. In some embodiments, the interference data can be fed into an algorithm that performs noise cancelation. In some embodiments, this is done by using the noise detected by the receiver when the transmitter is turned off to make a profile or model of the noise which is then subtracted from the actual transmit signal once the transmitter is turned back on again. This technique allows for dynamic interference compensation.

More specifically, in the above described example a display rate of 120 Hz was assumed. At a display rate of 120 Hz one frame comprises 8.33 ms, and according to the above-described embodiment of the pulsing technique the system turns off the transmit drive signal for 2 ms out of every 8.33 ms frame. By turning the transmit drive signal on and then off, changes in the magnetic field can be detected. The field that is present when the transmit drive signal is turned off is the distortion and noise. In some embodiments, the 2 ms of measured distortion is used to create or model a distortion frame, and then the results of the distortion frame are used to subtract the distortion from the original signal. That is, when a distortion or noise condition is detected or sensed, the distortion or noise is modeled, and then signal processing techniques are used on the transmit signal to subtract or remove the distortion.

Thus, in some embodiments, a tracking system monitors any frequency for outside interference or distortion by taking the receive time slice, dividing it a little further, and then shutting off the transmitter sources. For that time period the system listens to all of the other sources, which are typically the sources of interference, distortion, and/or noise because the known standard frequency sources have been shut off. The system then models or makes a profile of the interference, distortion, and/or noise. In some embodiments, the modeling is done on a per frame basis instead of over time because, for example, the haptics can turn on and off randomly. The modeled interference, distortion, and/or noise is then subtracted from the transmitter signal when it is turned back on. This subtraction compensation technique is capable of providing a very clean transmitter signal and helps to solve the problem of magnetic interference with EM tracking systems used in gaming applications.

The subtraction compensation technique becomes more accurate over time as more samples are collected. Namely, over time, as the system collects more samples of the interference, the system will get a better picture of the interference itself. This better picture of the interference will result in more accurate profiles and models of the interference, which makes it much more accurate when it comes to subtracting the interference from the transmitter signal. Thus, after some time of collecting samples, the system can generate better profiles and models of the interference, which leads to greater accuracy when the interference is subtracted from the signal. Furthermore, a higher rate of sample collection can also increase accuracy. For example, in some embodiments 800 samples are collected every 8.33 ms. In some embodiments, with better hardware, 2400 samples are collected every 8.33 ms, which can increase accuracy.

It is noted that embodiments of the subtraction compensation technique described herein differ from audio processing techniques. At least one difference is that in audio processing the transmitter is never shut off. That is, audio applications cannot shut off the sources. In contrast, some of the embodiments of the present invention shut off the transmitter as described above and then look for the noise, which is different than audio processing techniques.

Thus, in some embodiments, one technique that is used for compensating for the magnetic interference operates by pulsing the magnetic transmitter on and off and then monitoring and modeling the interference from the noise sources. The modeled interference is then subtracted from the actual transmit signal when the transmitter is turned on. That is, in some embodiments, the compensating for the magnetic interference comprises using the samples collected by a receive coil during the periods when at least one transmit coil is turned off to model the interference. Then, a portion of the signal generated by the at least one transmit coil during periods when the at least one transmit coil is turned on is subtracted. The portion that is subtracted is based on the modeled interference. In some embodiments, the subtraction may comprise a background subtraction, and the method may comprise standard spectrum subtraction, waveform subtraction, or machine learning based subtraction. Machine learning will be discussed more below. Thus, in some embodiments, interference may be compensated for and/or removed using spectrum subtraction.

Figure 3A:
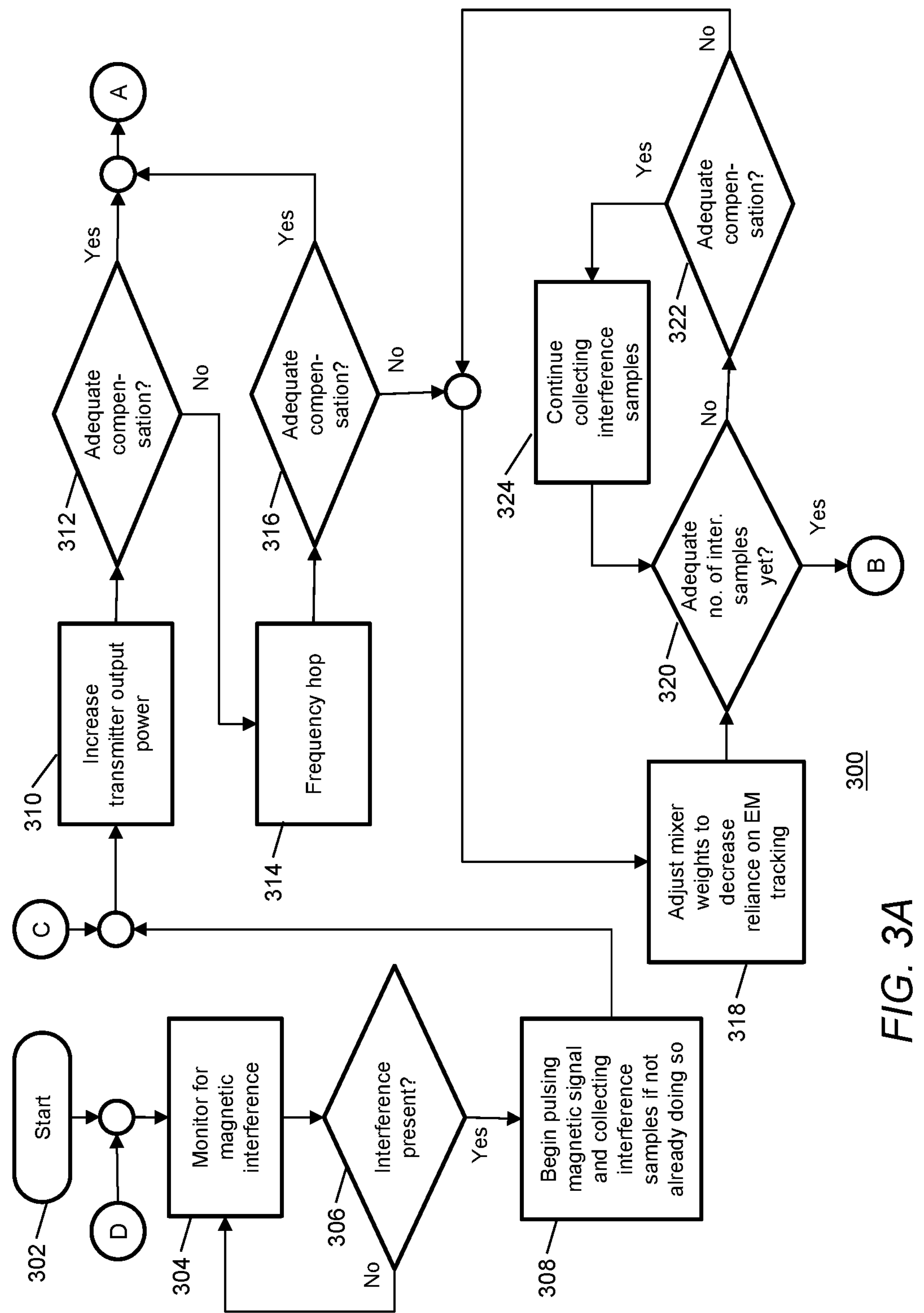
FIGS. 3A and 3B are flow diagrams illustrating a method in accordance with some embodiments of the present invention.
Figure 3B:
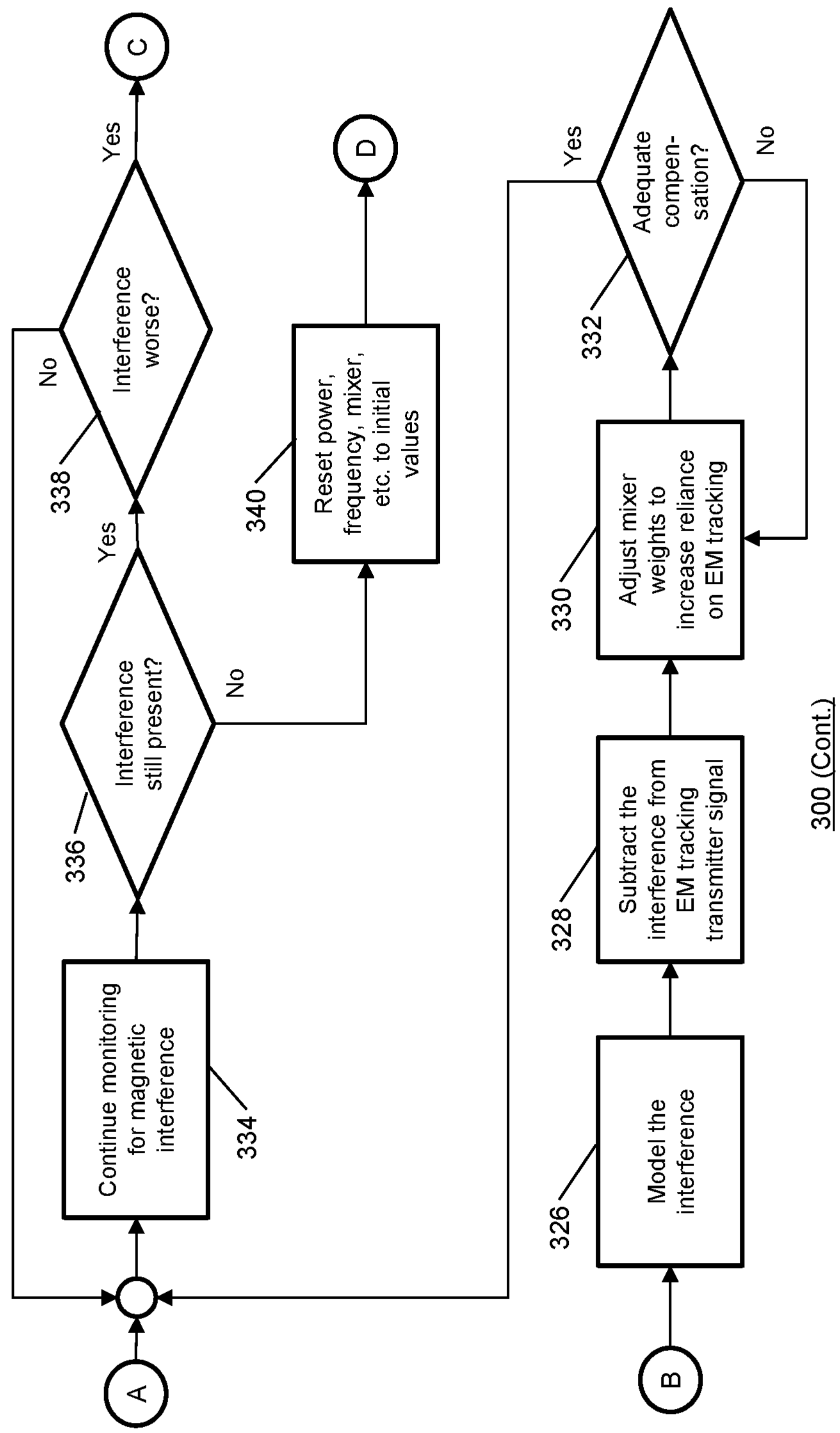

As mentioned above, once the presence of magnetic interference with an EM tracking system is sensed or detected, some of the embodiments of the present invention provide a multipronged approach for compensating for the magnetic interference. An example of such an approach is illustrated in FIGS. 3A and 3B, which illustrates a method 300 that operates in accordance with an embodiment of the present invention. In some embodiments, the method 300 may be used by a positional tracking system in tracking and/or detecting the position within three-dimensional space of a tangible object, such as for example a UI controller, a VR, AR, or MR headset, such as head-mounted display (HMD), one or more other types of handheld controllers, etc.

As discussed above sensor fusion is the combining or mixing of data from two or more different positional tracking technologies, techniques, or algorithms, which is also sometimes referred to as a "mixed mode" tracking system. In the illustrated embodiment, the method 300 is used by a mixed mode positional tracking system that includes an EM tracking system component and at least one other positional tracking technology component, such as for example inertial tracking, optical tracking, and/or acoustic tracking.

It should be well understand that the method 300 is just one example of a multipronged approach for compensating for magnetic interference and that the method 300 and the multipronged approach may have many variations in accordance with various embodiments of the present invention. For example, the various different techniques for compensating for magnetic interference may be executed in a different order, more or fewer of the different techniques may be used, various different options for each of the techniques may be added or eliminated, etc. Thus, in some embodiments various steps in the method 300 are optional steps.

The method 300 begins in the start step 302. In step 304 the tracking system monitors for the presence of magnetic interference that might affect the EM tracking system component. For example, in some embodiments the pulsing technique described above may be used to detect or sense the presence of interference with a magnetic field generated by the EM tracking system. It should be understood, however, that the pulsing technique is not required and that other techniques for detecting or sensing the presence of magnetic interference may be used. For example, an alternative technique that does not require pulsing the magnetics signal will be described below.

In step 306 a determination is made as to whether or not the presence of magnetic interference has been sensed or detected. If not, the process returns to step 304 to continue monitoring for the presence of magnetic interference. If the presence of magnetic interference has been sensed or detected, the process continues on to step 308.

In step 308, if it is not already doing so, the EM tracking system component begins pulsing the magnetics signal and collecting interference samples as described above. The reason for this is because the magnetic interference subtraction compensation technique described above is one of the compensation techniques that might be used. As described above, the subtraction compensation technique becomes more accurate over time as more samples of the interference are collected. As such, it is sometimes advantageous to start the sample collection as soon as possible. As mentioned above, in some embodiments, the pulsing technique may be used in step 304 to detect or sense the presence of interference, in which case the system will already be collecting samples of the interference.

The process then continues on to step 310. In some embodiments, step 310 represents a possible first step in a multipronged approach for compensating for the magnetic interference. Specifically, in step 310 the output power level of at least one transmit coil used by the EM tracking system component is increased. For example, the power level of the transmit drive signal may be increased. Thus, in some embodiments, if the presence of magnetic interference or noise has been sensed or detected, one possible first step of trying to compensate for the interference or noise is to turn up the power or volume of the transmitter. That is, the power of the transmitter is used to compensate for the magnetic interference and/or noise.

In some embodiments, a sensor fusion unit or engine of the mixed mode tracking system monitors all signals coming in and makes a decision on how to compensate for interference and noise. A sensor fusion unit may, for example, receive a message from the receiver of the EM tracking component that the system is in a 30% interference or noise scenario. As such, the sensor fusion unit may first decide to increase transmitter output power to compensate for the interference because it knows it can compensate for a 30% noise scenario.

In step 312 a determination is made as to whether or not the increase in the transmitter output power provides adequate compensation for the magnetic interference. If so, the process continues on to step 334 via connector A, which will be explained below. If not, the process continues on to step 314 to try another compensation technique.

In some embodiments, step 314 represents a possible second step in a multipronged approach for compensating for the magnetic interference. In step 314 the EM tracking component hops or changes to a different operating frequency. Specifically, in some embodiments the EM tracking component initially operates at 27 kHz, which is the high side of the audio spectrum. In some embodiments, the EM tracking component is capable of operating in the range from 27 kHz to 80 or 90 kHz. If an interference condition is detected the EM tracking component can try hopping or changing to a different operating frequency in that range to see if it provides adequate compensation for the interference. That is, if the current operating frequency is getting noisy or distorted, the system can try hopping to a different frequency in hopes of finding a cleaner channel. Thus, that is what happens in step 314, i.e. the EM tracking component hops to a different operating frequency in that range. In some embodiments, the system monitors a frequency band and finds one with low noise, and then hops to it.

In step 316 a determination is made as to whether or not the hopping to a different operating frequency provides adequate compensation for the magnetic interference. If so, the process continues on to step 334 via connector A, which will be explained below. If not, the process continues on to step 318 to try another compensation technique.

In some embodiments, step 318 represents a possible third step in a multipronged approach for compensating for the magnetic interference. Specifically, as mentioned above it is assumed that a mixed mode tracking system is being used to track the tangible object. With a mixed mode tracking system the weights can be adjusted to rely more heavily on another tracking technology when interference or distortion is detected or sensed. For example, the system can mix in more inertial tracking or optical tracking and reduce the amount of EM tracking if the interference is affecting the EM tracking.

Thus, in step 318 the mixer weights are adjusted to, for example, decrease reliance on the EM tracking component, or to adjust the weight of consideration given to another positional tracking technology component. For example, the data fusion unit adjusts the mixer weights to decrease reliance on the EM tracking component and increase reliance on one or more of the other tracking technology components. As another example, the weight of consideration given to an optical tracking system and/or an inertial tracking system may be increased. As such, the relative weight of consideration given to the EM tracking system component will be decreased. Basically, in some embodiments, the system may notify the fusion function that is taking all positional inputs and tell it to rely less on the EM tracking and more on one of the other tracking system components, like IMU or optical. This will help compensate for the magnetic interference and/or noise that is adversely affecting the EM tracking system component.

Thus, in some embodiments, this interference compensation technique comprises adjusting a weight of consideration given to another tracking technology component used to track the tangible object and/or decreasing reliance on the EM tracking component. In some embodiments, the other tracking technology component may comprises a technology that uses an inertial measurement unit (IMU) or the like and/or an optical tracking technology and/or some other tracking technology.

As mentioned above, it should be well understand that the method 300 and the illustrated multipronged approach for compensating for magnetic interference described herein is just one example and that it may have many variations in accordance with various embodiments of the present invention. For example, in some embodiments, the first step in a multipronged approach for compensating for magnetic interference may be to notify the fusion unit or engine to change the mixer weights. Furthermore, in some embodiments, as part of the notification to the fusion unit, a noise threshold, or a signal to noise ratio value, is also supplied. Such value may be used to decide how much to adjust the mixer weights. Based on what that value is, the fusion unit will make a decision on what sources of data and tracking to rely on the most. That is, the fusion unit will make a decision of what tracking technologies to rely on based on the threshold.

Referring again to FIGS. 3A and 3B, the process then continues on to step 320. As was described above, in step 308 the EM tracking system component began collecting samples of the interference. In step 320 a determination is made as to whether or not an adequate number of interference samples have been collected at that point in time so as to be able to generate an adequate model or profile of the interference. This determination is made because as will be discussed below the magnetic interference subtraction compensation technique represents a possible fourth step in a multipronged approach for compensating for the magnetic interference. If an adequate number of interference samples have been collected, the process continues on to step 326 via connector B, which will be explained below. If not, the process continues on to step 322.

In step 322 a determination is made as to whether or not the adjustments made to the mixer weights in step 318 provide adequate compensation for the magnetic interference affecting the EM tracking component. If so, the process continues on to step 324. If not, the process returns to step 318 to adjust the mixer weights some more in an attempt to provide adequate compensation for the magnetic interference. In some embodiments, if the interference is severe enough, the data fusion unit might adjust the mixer weights so as to decrease reliance on the EM tracking component all the way down to 0% and instead completely rely on one or more of the other tracking technology components. That is, reliance on the EM tracking component might be completely eliminated while severe interference persists. As such, the tracking system would go to alternative forms of tracking, such as IMU, gyroscope, optical, or a mixture of those technologies.

If the adjustments made to the mixer weights in step 318 do provide adequate compensation for the magnetic interference, the process continues on to step 324. In step 324 the EM tracking component continues collecting samples of the interference. The process then returns to step 320 where a determination is again made as to whether or not an adequate number of interference samples have been collected at that point in time so as to enable the generation of an adequate model or profile of the interference.

In some embodiments, the adjustments made to the mixer weights in step 318 are considered to be a quick and temporary way to provide compensation for the magnetic interference. That is, when the tracking system first sees a lot of interference and/or noise with the EM tracking component, the system first tries the more immediate fixes of increasing the transmitter output power, hopping to a different operating frequency, and/or adjusting the mixer weights. Regarding the latter, for example, when the tracking system first sees a lot of interference, the system can quickly rely more on an IMU. That is, the system can rely on the IMU for the next couple of PNO calculations when it first sees the interference and/or distortion. At this point the system may not have enough samples of the interference to model it for the subtraction technique, and so it uses the IMU for a couple of iterations.

But eventually, the IMU will start to drift, and so in some embodiments it is preferable to return to relying on the more accurate EM tracking component as quickly as possible. The EM tracking component can be made more accurate in the presence of the interference by modeling the interference and then using the subtraction technique described above. Therefore, in some embodiments, it is preferable to start the subtraction compensation technique as soon as an adequate number of interference samples have been collected.

In step 320, when it is determined that an adequate number of interference samples have been collected, the process continues on to step 326 via connector B. Having reached step 326 means that an adequate number of interference samples have been collected. As such, the system is ready to use the subtraction of interference technique so it can return to relying more on the EM tracking component after having relied on an IMU for a few iterations to derive PNO due to the presence of interference.

In step 326 the collected samples of the interference are used to model or make a profile of the interference. And then in step 328 the modeled interference is subtracted from the EM tracking transmitter signal when it is turned on. In some embodiments, these steps may be performed substantially as is described herein above.

In step 330 the mixer is adjusted to increase reliance on the EM tracking component. That is, now that the subtraction of interference compensation technique is being performed, the system returns to relying more on the EM tracking component. The EM tracking component will have improved accuracy even in the presence of interference due to the subtraction of interference compensation technique. Consequently, reliance on other tracking technologies, such as inertial and/or optical, will be decreased. As mentioned above, in some embodiments, it is preferable that inertial tracking not be relied on for long periods of time due to drift.

In step 332 a determination is made as to whether or not the adjustments made to the mixer weights in step 330 provide adequate compensation for the magnetic interference affecting the EM tracking component. If so, the process continues on to step 334. If not, the process returns to step 330 to adjust the mixer weights some more in an attempt to provide adequate compensation for the magnetic interference.

There are several paths that lead to step 334. As was explained above, two paths that lead to step 334 are determinations made in steps 312 and 316 that adequate compensation for the magnetic interference has been provided. And another path that leads to step 334 is a determination made in step 332 that adequate compensation for the magnetic interference has been provided.

In step 334 the system continues monitoring for the presence of magnetic interference. And in step 336 a determination is made as to whether or not the magnetic interference is still present. If so, the process continues on to step 338 where a determination is made as to whether or not the magnetic interference has become worse. If so, the process returns to step 310 via connector C. By returning to step 310 the multipronged approach for compensating for the magnetic interference is essentially repeated for the now even worse or more severe presence of magnetic interference. If, however, in step 338 a determination is made that the magnetic interference has not become worse, the process returns to step 334 where the system continues monitoring for the presence of magnetic interference.

If in step 336 a determination is made that the magnetic interference is no longer present, the process continues on to step 340. In step 340, because magnetic interference is no longer present, the EM tracking transmitter output power, frequency of operation, and mixer settings, etc., are all reset to their initial values. Because magnetic interference is no longer an issue, the system can return to its original settings.

The process then returns to step 304 via connector D where the system monitors for the presence of magnetic interference. If magnetic interference is again detected or sensed, the entire process will be repeated.

With respect to step 304 in which the tracking system monitors for the presence of magnetic interference, it was mentioned above that the pulsing technique is not required and that other techniques for detecting or sensing the presence of magnetic interference may be used. For example, in some embodiments the following alternative technique that does not require pulsing the magnetics signal may be used.

Specifically, in some embodiments, the detecting a presence of interference with a magnetic field generated by an EM tracking system comprises monitoring the frequency spectrum of the EM signal, such as for example by performing a Fourier analysis on samples collected by a receive coil used by the EM tracking system. For example, the system can look at the results of a fast Fourier transform (FFT) that is run on the samples that are collected over one frame period (e.g. 800 samples), and based on the results the system can determine whether there is interference and/or noise present. Such a determination can be made because the FFT provides the frequency of the noise. By detecting the frequency of the noise it can be identified as noise based on spikes. In this way an FFT can be used to detect noise, and with this method no pulsing and no subtraction from the EM tracking transmitter signal is required. In some embodiments, cycling the transmitter on and off may still be used for canceling the interference, but again, it is not needed for detecting the presence of interference.

Thus, in some embodiments there are two ways to detect interference with an EM tracking system. Namely, the EM tracking transmitter can be shut off so the system can listen for the interference. Or, the system can leave the EM tracking transmitter turned on constantly and detect interference with an FFT. If the later technique is used the transmitter signal does not have to be pulsed to detect interference and can be left turned on. The system can start pulsing the transmitter on and off after the interference is detected so that it can do the subtraction compensation method.

In some embodiments, machine learning is used to implement a multipronged approach for compensating for magnetic interference affecting an EM tracking system. For example, in some embodiments, all the different combinations of ways to compensate for magnetic interference are modeled through the machine learning. This can be accomplished by collecting a lot of data with a receiver of an EM tracking system. The data includes known clean samples and known interference and/or noise samples. In some embodiments, the known interference samples and the known clean samples are fed into a neural network, and after enough training, the network can tell when the system is in an interference condition and how best to compensate for it. For example, in some embodiments, an interference condition can be detected by training a classifier, such as a neural network, a support-vector machine (SVM), etc., using signals both with and without EM interference. In some embodiments, interference may be compensated for and/or removed using a machine learning based autoencoder, such as a generative adversarial network (GAN), or a neural network based filter that is trained on top of both clean and interfered EM signals.

Thus, with machine learning, an EM tracking system is able to automatically recognize the presence of interference during operation based on the collected samples. The system will then automatically determine the best way to compensate for the interference. For example, the system will automatically determine the best combination of transmitter output power or volume, operating frequency, data fusion mixer weights, interference subtraction, etc., for compensating for the interference. That is, in some embodiments, all of the different combinations of compensating are modeled through machine learning. Therefore, in some embodiments, the compensating for magnetic interference comprises using a compensation scheme that is determined based on machine learning after consideration of samples collected by a receive coil used by the EM tracking system.

Embodiments of the present invention provide techniques for use with an EM tracking system for detecting the presence of magnetic interference and then compensating for the magnetic interference. In some embodiments the techniques are used by a mixed mode positional tracking system that includes an EM tracking system component and at least one other positional tracking technology component, such as for example inertial tracking, optical tracking, and/or acoustic tracking. In some embodiments the system first detects or senses that the system is in an interference and/or distortion environment or otherwise detects the presence of magnetic interference. Then, the system undertakes to apply methods and/or techniques to compensate for magnetic interference. This can help to make EM tracking less susceptible to magnetic interference and thus more usable for many applications, including gaming applications, as well as for VR, AR, and MR applications.

In some embodiments, once the system has detected that an interference condition exists, it then starts a multipronged approach to compensating for or eliminating the interference. That is, once the presence of magnetic interference is detected or sensed, a multipronged approach for compensating for the magnetic interference can then be performed in accordance with some embodiments of the present invention. In some embodiments, the multipronged approach for compensation may include various combinations of increasing transmitter output power or volume, changing the operating frequency of the EM tracking component, changing the sensor fusion mixer weights to, for example, decrease reliance on the EM tracking component, and performing the interference subtraction scheme described above.

In some embodiments, a multipronged approach for compensating for magnetic interference comprises first increasing a power level of at least one transmit coil used by the EM tracking system and/or adjusting a weight of consideration given to another tracking technology used to track the tangible object, and then using samples collected by a receive coil during periods when the at least one transmit coil is turned off to model the interference, and then subtracting a portion that is based on the modeled interference from a signal generated by the at least one transmit coil during periods when the at least one transmit coil is turned on.

Regarding the sensor fusion mixer weights, in some embodiments for example, the system may send a message to the fusion unit to put a little less weight on the EM tracking for the next frame. Regarding the interference subtraction scheme, in some embodiments for example, the system makes a profile or model of the interference and/or noise and then subtracts it from the transmit signal. In some embodiments, machine learning is used to automatically recognize the presence of interference and then automatically determine the best and most effective combination of the various compensation techniques for compensating for the interference.

Figure 4:
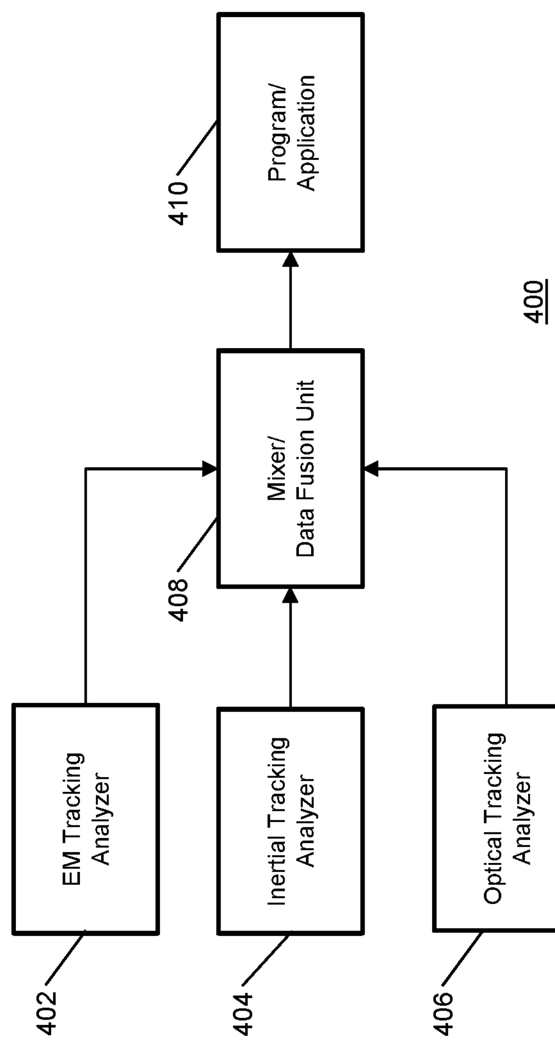
FIG. 4 is a flow diagram illustrating an operation of a mixed mode positional tracking system in accordance with some embodiments of the present invention.

Referring to FIG. 4 there is illustrated a flow diagram for a mixed mode positional tracking system 400 that operates in accordance with an embodiment of the present invention. The system 400, which may be used for implementing some of the methods and techniques described above, includes an EM tracking system component and at least one other positional tracking technology component, which in this example comprises an inertial tracking component and an optical tracking component. Specifically, the system 400 includes an EM tracking analyzer 402, an inertial tracking analyzer 404, and an optical tracking analyzer 406. Each of these analyzers receives signals from a sensed environment. The analyzers 402, 404, and 406 may be implemented in hardware, in software (or firmware), or some combination of two or more of these. Each of the analyzers produces tracking information related to the position and/or orientation of an object of interest. By way of example, the object of interest may be a UI controller and/or headset, or any other similar devices described above.

The EM tracking analyzer 402 may include or implement instructions that analyze the signals or magnetic fields generated by transmit and receive coils as described above. The inertial tracking analyzer 404 may include or implement instructions that analyze the signals generated by an inertial sensor, accelerometer, gyroscope, or the like. Similarly, the optical tracking analyzer 406 may include or implement instructions that analyze images captured by a camera or other image capture device.

The system 400 also includes a mixer/data fusion unit 408, which similarly may be implemented in hardware, in software (or firmware), or some combination of two or more of these. The mixer 408 mixes the EM tracking information from the EM tracking analyzer 402, the inertial tracking information from the inertial tracking analyzer 404, and the optical tracking information from the optical tracking analyzer 406 to generate refined position and/or orientation information. By way of example, the mixer 408 may apply different weights to the EM, inertial, and optical tracking information based on any of the magnetic interference compensation methods and techniques described above, as well as other program, application, game, or environmental conditions.

The output of the mixer 408 is provided to a program, application, or other software or hardware process 410. For example, in some embodiments the program 410 comprises a game application that uses the position and/or orientation information provided by the mixer 408. In some embodiments, the program 410 comprises an application, process, and/or system used by a VR, AR, and/or MR system that uses the position and/or orientation information provided by the mixer 408.

In some embodiments, the methods, schemes, and techniques described herein may be utilized, implemented and/or run on many different types of processor based apparatuses or systems. For example, the methods, schemes, and techniques described herein may be utilized, implemented, and/or run in any type of VR, AR, and MR system, and any such system may be implemented on smartphones, game consoles, entertainment systems, portable devices, mobile devices, pad-like devices, computers, workstations, desktop computers, notebook computers, servers, etc. Furthermore, in some embodiments the methods, schemes, and techniques described herein may be utilized, implemented and/or run in online scenarios, networked scenarios, over the Internet, etc.

Figure 5:
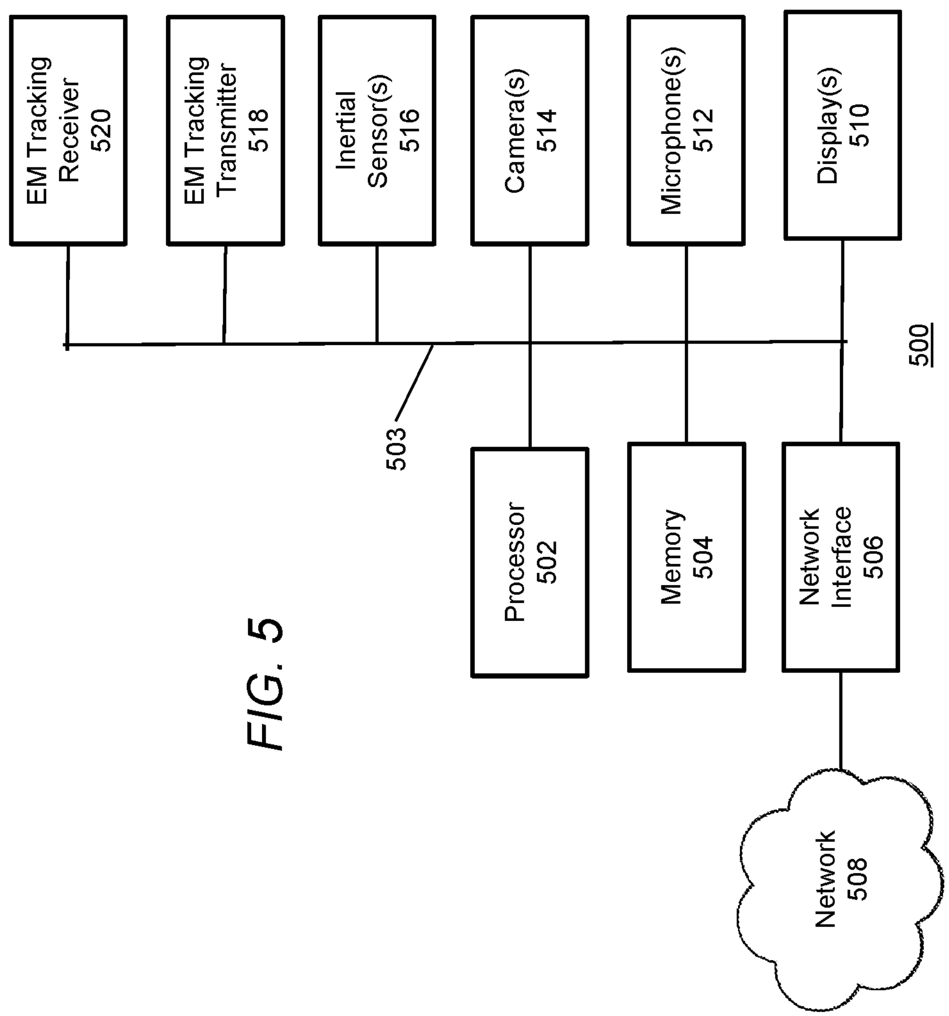
FIG. 5 is a block diagram illustrating a processor based apparatus/system that may be used to run, implement, and/or execute any of the methods, schemes, and techniques shown and described herein in accordance with some embodiments of the present invention.

Referring to FIG. 5, there is illustrated an example of a processor based system 500 that may be used for any such implementations. The system 500 may be used for implementing any method, scheme, technique, system, or device mentioned above. However, the use of the system 500 or any portion thereof is certainly not required.

By way of example, the processor based system 500 may include, but is not required to include, a processor 502 (e.g. a central processing unit (CPU)), a memory 504, a wireless and/or wired network interface 506, access to a network 508, one or more displays 510, one or more microphones 512, one or more cameras or other image capture devices 514, one or more inertial sensors 516, an EM tracking transmitter 518, and an EM tracking receiver 520. One or more of these components may be collected together in one apparatus, device, or system, or the various components may be distributed across one or more different apparatuses, devices, or systems, or even distributed across one or more networks. In some embodiments, one or more of these components may be collected together in one or more embedded systems. The components communicate with each other via connections and/or communications channels 503, which may comprise wired connections, wireless connections, network connections, or a mixture or combination of both wired and wireless connections, communications channels, network connections, buses, etc.

The processor 502 may be used to execute or assist in executing the steps of the methods, schemes, and techniques described herein, and various program content, images, video, overlays, UIs, assets, virtual worlds, menus, menu screens, interfaces, graphical user interfaces (GUIs), windows, tables, graphics, avatars, characters, players, video games, simulations, etc., may be rendered on the display(s) 510. In some embodiments, the processor 502 executes code, software, or steps that implements the mixed mode positional tracking system 400 (FIG. 4) described above.

The one or more displays 510 may comprises any type of display devices and may be used for implementing the above described VR, AR, and/or MR environments. For example, in some embodiments one or more displays 510 may be included in a head worn device such as a headset, glasses-type user device, head-mounted display (HMD), or the like. In some embodiments the one or more displays 510 may be included or associated with any type of VR device, AR device, or MR device. In some embodiments a display may be included in a device such as a smartphone, tablet computer, pad-like computer, notebook computer, etc. In some embodiments one or more displays 510 may be associated with any type of computer such as desktop computers, etc. The one or more displays 510 may comprise any type of display or display device or apparatus, using any type of display technology.

The memory 504 may include or comprise any type of computer readable storage or recording medium or media. In some embodiments, the memory 504 may include or comprise a tangible, physical memory. In some embodiments, the memory 504 may be used for storing program or computer code or macros that implements the methods and techniques described herein, such as program code for running the methods, schemes, and techniques described herein. In some embodiments, the memory 504 may serve as a tangible non-transitory computer readable storage medium for storing or embodying one or more computer programs or software applications for causing a processor based apparatus or system to execute or perform the steps of any of the methods, code, schemes, and/or techniques described herein. Furthermore, in some embodiments, the memory 504 may be used for storing any needed database(s).

In some embodiments, the wireless and/or wired network interface 506 may be used for accessing the network 508 for obtaining any type of information, such as for example any information needed for implementing or running the positional tracking technologies discussed herein, and/or any information needed for implementing or running a machine learning based multipronged approach for compensating for magnetic interference affecting an EM tracking system described herein. The network 508 may comprise the Internet, a local area network, an intranet, a wide area network, or any other network.

The one or more microphones 512 may comprise any type of microphones. In some embodiments, the one or more microphones 512 may be used for implementing the acoustic tracking and/or acoustic sensing discussed above. In some embodiments, the one or more microphones 512 may be located or positioned on a user's headset, glasses-type user device, HMD, or elsewhere in an VR, AR, or MR environment or room. In some embodiments, the one or more microphones 512 may be included or associated with a device such as a smartphone, tablet computer, pad-like computer, notebook computer, desktop computer, etc.

The one or more cameras or other image capture devices 514 may comprise any type of cameras or image capture devices. In some embodiments, the one or more cameras 514 may be used for implementing and/or enabling an optical tracking system, optical tracking component, and/or optical tracking technology as discussed above. In some embodiments, the one or more cameras 514 may be used for identifying, recognizing, and/or determining the geometry, form factor, size, location, and/or position of tangible objects, and/or for detecting intersections of various geometries. In some embodiments, the one or more cameras 514 may comprise depth cameras, depth sensing cameras, stereo cameras, or any other type of camera or image capture device. In some embodiments, the one or more cameras 514 may be located or positioned on a user's headset, glasses-type user device, HMD, or elsewhere in an VR, AR, or MR environment or room. In some embodiments, the one or more cameras 514 may be included or associated with a device such as a smartphone, tablet computer, pad-like computer, notebook computer, desktop computer, etc.

The one or more inertial sensors 516 may comprise any type of inertial sensors or devices, such as for example inertial measurement units (IMU), accelerometers, gyroscopes, and the like. In some embodiments, the one or more inertial sensors 516 may be used for implementing and/or enabling an inertial tracking system, inertial tracking component, and/or inertial tracking technology as discussed above. In some embodiments, the one or more inertial sensors 516 may be located or positioned in a handheld controller, UI controller, game pad, wand, or similar device, and/or on a user's headset, glasses-type user device, HMD, or elsewhere in an VR, AR, or MR environment or room. In some embodiments, the one or more inertial sensors 516 may be included or associated with a device such as a smartphone, tablet computer, pad-like computer, notebook computer, desktop computer, etc. In some embodiments, the one or more inertial sensors 516 may comprise any type of sensors for sensing, determining, and/or tracking the movements, position, and/or motions of a user and/or a tangible object.

The EM tracking transmitter 518 and EM tracking receiver 520 may comprise any type of transmitter and receiver suitable for use with an EM tracking system. In some embodiments, the EM tracking transmitter 518 and EM tracking receiver 520 may be used for implementing and/or enabling an EM tracking system, EM tracking component, and/or EM tracking technology as discussed above. In some embodiments, the EM tracking transmitter 518 may be included in or attached to a user headset, such for example an HMD, glasses-type user device, or similar device. In some embodiments, the EM tracking receiver 520 may be included in or attached to a handheld controller, UI controller, game pad, wand, or similar device. It should be well understood, however, that in some embodiments the locations of the EM tracking transmitter 518 and the EM tracking receiver 520 may be reversed, i.e. the EM tracking transmitter 518 included in or attached to a handheld controller, UI controller, etc., and the EM tracking receiver 520 included in or attached to a user headset, HMD, etc. Furthermore, in some embodiments the EM tracking transmitter 518 and the EM tracking receiver 520 may be located elsewhere as appropriate for the particular application.

In some embodiments, one or more of the embodiments, methods, approaches, schemes, and/or techniques described above may be implemented in one or more computer programs or software applications executable by a processor based apparatus or system. By way of example, such processor based system may comprise a smartphone, tablet computer, VR, AR, or MR system, entertainment system, game console, mobile device, computer, workstation, desktop computer, notebook computer, server, graphics workstation, client, portable device, pad-like device, etc. Such computer program(s) or software may be used for executing various steps and/or features of the above-described methods, schemes, and/or techniques. That is, the computer program(s) or software may be adapted or configured to cause or configure a processor based apparatus or system to execute and achieve the functions described herein. For example, such computer program(s) or software may be used for implementing any embodiment of the above-described methods, steps, techniques, schemes, or features. As another example, such computer program(s) or software may be used for implementing any type of tool or similar utility that uses any one or more of the above described embodiments, methods, approaches, schemes, and/or techniques. In some embodiments, one or more such computer programs or software may comprise a VR, AR, or MR application, a tool, utility, application, computer simulation, computer game, video game, role-playing game (RPG), other computer simulation, or system software such as an operating system, BIOS, macro, or other utility. In some embodiments, program code macros, modules, loops, subroutines, calls, etc., within or without the computer program(s) may be used for executing various steps and/or features of the above-described methods, schemes and/or techniques. In some embodiments, such computer program(s) or software may be stored or embodied in a non-transitory computer readable storage or recording medium or media, such as a tangible computer readable storage or recording medium or media. In some embodiments, such computer program(s) or software may be stored or embodied in transitory computer readable storage or recording medium or media, such as in one or more transitory forms of signal transmission (for example, a propagating electrical or electromagnetic signal).

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, schemes, and/or techniques described herein. For example, in some embodiments the present invention provides one or more non-transitory computer readable storage mediums storing one or more computer programs adapted or configured to cause a processor based apparatus or system to execute steps comprising: using an electromagnetic (EM) tracking system to track a tangible object; detecting a presence of interference with a magnetic field generated by the EM tracking system; and compensating for the interference.

While the invention herein disclosed has been described by means of specific embodiments and applications thereof, numerous modifications and variations could be made thereto by those skilled in the art without departing from the scope of the invention set forth in the claims.

What is claimed is:

1. A method, comprising:

using an electromagnetic (EM) tracking system to track a tangible object;

detecting a presence of interference with a magnetic field generated by the EM tracking system;

collecting interference samples with a receive coil used by the EM tracking system during periods when at least one transmit coil used by the EM tracking system is turned off;

periodically determining a number of interference samples that have been collected; and generating, with a processor, a model of the interference after the periodically determining a number of interference samples that have been collected.

2. The method of claim 1, wherein the detecting a presence of interference with a magnetic field generated by the EM tracking system comprises:

periodically turning off the at least one transmit coil used by the EM tracking system; and analyzing initial interference samples collected by the receive coil used by the EM tracking system during periods when the at least one transmit coil is turned off.

3. The method of claim 1, further comprising:

subtracting a portion of a signal generated by the at least one transmit coil during periods when the at least one transmit coil is turned on, wherein the portion is based on the model of the interference.

4. The method of claim 1, wherein the detecting a presence of interference with a magnetic field generated by the EM tracking system comprises:

monitoring a frequency spectrum of a signal received by the EM tracking system.

5. The method of claim 1, further comprising:

increasing a power level of the at least one transmit coil used by the EM tracking system in an attempt to compensate for the interference.

6. The method of claim 1, further comprising:

adjusting a weight of consideration given to another tracking system used to track the tangible object in an attempt to compensate for the interference.

7. The method of claim 6, wherein the another tracking system used to track the tangible object comprises an inertial tracking system.

8. The method of claim 6, wherein the another tracking system used to track the tangible object comprises an optical tracking system.

9. The method of claim 1, further comprising:

using an interference compensation scheme that is determined based on machine learning after consideration of any samples collected by the receive coil used by the EM tracking system.

10. A system, comprising:

an electromagnetic (EM) tracking transmitter;

an EM tracking receiver; and a processor based apparatus in communication with the EM tracking transmitter and the EM tracking receiver;

wherein the processor based apparatus is configured to execute steps comprising:

using the EM tracking transmitter and the EM tracking receiver to implement an EM tracking system;

using the EM tracking system to track a tangible object;

detecting a presence of interference with a magnetic field generated by the EM tracking system;

collecting interference samples with a receive coil used by the EM tracking system during periods when at least one transmit coil used by the EM tracking system is turned off;

periodically determining a number of interference samples that have been collected; and generating a model of the interference after the periodically determining a number of interference samples that have been collected.

11. The system of claim 10, wherein the detecting a presence of interference with a magnetic field generated by the EM tracking system comprises:

periodically turning off the at least one transmit coil used by the EM tracking system; and analyzing initial interference samples collected by the receive coil used by the EM tracking system during periods when the at least one transmit coil is turned off.

12. The system of claim 10, wherein the processor based apparatus is further configured to execute steps comprising:

subtracting a portion of a signal generated by the at least one transmit coil during periods when the at least one transmit coil is turned on, wherein the portion is based on the model of the interference.

13. The system of claim 10, wherein the detecting a presence of interference with a magnetic field generated by the EM tracking system comprises:

monitoring a frequency spectrum of a signal received by the EM tracking system.

14. The system of claim 10, wherein the processor based apparatus is further configured to execute steps comprising:

increasing a power level of the at least one transmit coil used by the EM tracking system in an attempt to compensate for the interference.

15. The system of claim 10, wherein the processor based apparatus is further configured to execute steps comprising:

adjusting a weight of consideration given to another tracking system used to track the tangible object in an attempt to compensate for the interference.

16. The system of claim 10, wherein the processor based apparatus is further configured to execute steps comprising:

using an interference compensation scheme that is determined based on machine learning after consideration of any samples collected by the receive coil used by the EM tracking system.

17. A non-transitory computer readable storage medium storing one or more computer programs configured to cause a processor based system to execute steps comprising:

using an electromagnetic (EM) tracking system to track a tangible object;

detecting a presence of interference with a magnetic field generated by the EM tracking system;

collecting interference samples with a receive coil used by the EM tracking system during periods when at least one transmit coil used by the EM tracking system is turned off;

periodically determining a number of interference samples that have been collected; and generating a model of the interference after the periodically determining a number of interference samples that have been collected.

18. The non-transitory computer readable storage medium of claim 17, wherein the detecting a presence of interference with a magnetic field generated by the EM tracking system comprises:

periodically turning off the at least one transmit coil used by the EM tracking system; and analyzing initial interference samples collected by the receive coil used by the EM tracking system during periods when the at least one transmit coil is turned off.

19. The non-transitory computer readable storage medium of claim 17, wherein the one or more computer programs are further configured to cause the processor based system to execute steps comprising:

subtracting a portion of a signal generated by the at least one transmit coil during periods when the at least one transmit coil is turned on, wherein the portion is based on the model of the interference.

20. The non-transitory computer readable storage medium of claim 17, wherein the detecting a presence of interference with a magnetic field generated by the EM tracking system comprises:

monitoring a frequency spectrum of a signal received by the EM tracking system.

21. The non-transitory computer readable storage medium of claim 17, wherein the one or more computer programs are further configured to cause the processor based system to execute steps comprising:

adjusting a weight of consideration given to another tracking system used to track the tangible object in an attempt to compensate for the interference.

22. The non-transitory computer readable storage medium of claim 17, wherein the one or more computer programs are further configured to cause the processor based system to execute steps comprising:

increasing a power level of the at least one transmit coil used by the EM tracking system in an attempt to compensate for the interference.

23. The non-transitory computer readable storage medium of claim 17, wherein the one or more computer programs are further configured to cause the processor based system to execute steps comprising:

using an interference compensation scheme that is determined based on machine learning after consideration of any samples collected by the receive coil used by the EM tracking system.

* * * * *